Patented Nov. 19, 1940

2,221,931

UNITED STATES PATENT OFFICE 2,221,931

AGENT FOR COMBATING PESTS

Jules Treboux, Neue Welt, near Basel, Switzerland, assignor to J. R. Geigy A. G., Basel, Switzerland No Drawing. Application June 3, 1939, Serial No. 277,319. In Switzerland June 11, 1938

5 Claims. (Cl. 167—22)

This invention is based on the observation that the aminoketones of the composition

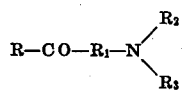

and

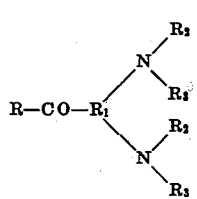

wherein R, $R_1$, $R_2$ and $R_3$ represent alkyl radicals, as well as their salts and quaternary compounds are very suitable for use as agents for combating pests. They have strong insecticide and fungicide effect.

These aminoketones are manufactured in manner in itself known from the disclosure in British specification No. 25963/12 (see for instance Example C), in general by the reaction between a ketone, formaldehyde and a secondary aliphatic amine. From acetone, formaldehyde and dimethylamine there is obtained, for example in the presence of caustic soda lye, a mixture of the two aminoketones of the formulae $$CH_3-CO-CH_2-CH_2-N\begin{matrix}CH_3\\CH_3\end{matrix}$$

β-acetyl-ethyl-dimethylamine and $$CH_3-CO-CH\begin{matrix}CH_2-N=(CH_3)_2\\CH_2-N=(CH_3)_2\end{matrix}$$

β-acetyl-trimethylene-tetramethyldiamine

By the same method other aminoketones useful in this invention may be made. For instance, from methylisobutylketone, formaldehyde and dimethylamine there is obtained a mixture of β-acetyl-β-isopropylethyldimethylamine

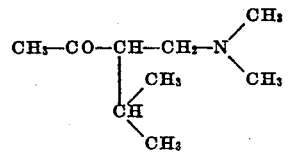

β-acetyl-β-isopropyl-trimethylene-tetramethyldiamine and

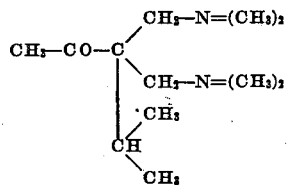

Other ketones which are suitable, are diethylketone, methylethylketone, methylpropylketone, methylheptadecylketone, methylpentadecylketone, methylundecylketone; other amines are diethylamine, dibutylamine etc.

By using these and other reactive ketones and secondary aliphatic amines a very large number of aminoketones suitable for the purpose of the invention are obtainable. Obviously also substitution products, for instance compounds containing hydroxyl groups, and/or halogen may be used in so far as the substitution does not influence the reaction leading to the formation of the aminoketones, for instance may be used morpholine compounds.

The following examples illustrate the invention:

Example 1

An alcoholic solution of 0.5 per cent strength of the product of the reaction of acetone, formaldehyde and dimethylamine made as described in British specification No. 25963/12, Example C, and consisting of a mixture of the 2-aminoketones named above, is used for exterminating house flies by the spraying method. After 2½ hours all flies are paralysed and after 24 hours dead.

Example 2

An emulsion containing 20 per cent of the product of the reaction of methylisobutylketone, formaldehyde and dimethylamine (or diethylamine), which emulsion is made in the manner usual in case of insecticides that are insoluble in water, is diluted in the proportion of 2:100 with water and the diluted emulsion is sprayed over rose bushes infected with aphides. After 20 minutes the aphides are dead without injury to the plant. Instead of the emulsion there may be used a solution of an organic or inorganic salt of the mixture of bases, for example the hydrochlorides.

A solution of 5 per cent strength of the same mixture of bases in petroleum of boiling point 210–250° C. is very suitable for exterminating flies by the spraying operation and the flies are immediately stunned and die after a few hours.

Example 3

A solution of 5 per cent strength of a quaternary salt of the mixture of bases named in Example 2 prepared by means of benzyl chloride in the usual manner is used as described in Example 1 for exterminating flies. After a short time the flies settle and soon die.

The same compound has a very strong fungicide effect. By the addition of 0.01 per cent of this quaternary compound a dextrose solution of 4 per cent strength becomes immune to mould.

What I claim is:

1. A pest combating agent, comprising at least one aliphatic aminoketone of the group consisting of

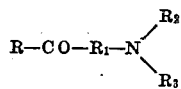

and

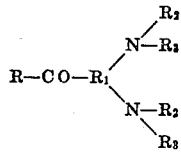

wherein R, $R_1$, $R_2$ and $R_3$ represent alkyl radicals.

2. A pest combating agent, comprising at least one aliphatic aminoketone as reaction product from a ketone, formaldehyde and a secondary aliphatic amine.

3. A pest combating agent, comprising at least one aliphatic aminoketone as reaction product from acetone, formaldehyde and dimethylamine.

4. A pest combating agent, comprising at least one aliphatic aminoketone as reaction product from methylisobutylketone, formaldehyde and dimethylamine.

5. A pest combating agent, comprising at least one aliphatic aminoketone as reaction product from methylisobutylketone, formaldehyde and diethylamine.

JULES TREBOUX.